(12) United States Patent
Yasui et al.

(10) Patent No.: US 9,030,707 B2
(45) Date of Patent: May 12, 2015

(54) LOG IMAGE CREATING SYSTEM THAT CREATES LOG IMAGE OF JOB IN IMAGE FORMING APPARATUS

(71) Applicant: Kyocera Document Solutions Inc., Osaka (JP)

(72) Inventors: Toru Yasui, Osaka (JP); Jumpei Takagi, Osaka (JP); Ryota Arinobu, Osaka (JP); Keiji Okamura, Osaka (JP); Rie Matsumoto, Osaka (JP); Masaki Kikuchi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/260,451

(22) Filed: Apr. 24, 2014

(65) Prior Publication Data

US 2014/0320869 A1 Oct. 30, 2014

(30) Foreign Application Priority Data

Apr. 24, 2013 (JP) ................................. 2013-091572

(51) Int. Cl.
G06K 15/02 (2006.01)
H04N 1/00 (2006.01)
G06F 3/12 (2006.01)

(52) U.S. Cl.
CPC ...................... *H04N 1/00* (2013.01)

(58) Field of Classification Search
None
See application file for complete search history.

(56) References Cited

U.S. PATENT DOCUMENTS

| 2007/0133037 | A1* | 6/2007 | Arai et al. | 358/1.14 |
| 2007/0135930 | A1* | 6/2007 | Kirihara et al. | 700/1 |
| 2007/0143361 | A1* | 6/2007 | Arai et al. | 707/202 |
| 2008/0055633 | A1* | 3/2008 | Kajiyama et al. | 358/1.15 |
| 2014/0347691 | A1* | 11/2014 | Takagi et al. | 358/1.15 |

FOREIGN PATENT DOCUMENTS

JP 2008123039 5/2008

* cited by examiner

*Primary Examiner* — Dov Popovici
(74) *Attorney, Agent, or Firm* — K&L Gates LLP

(57) ABSTRACT

A log image creating system includes a job type determining unit and a log image creating unit. If the job type determining unit determines that the job is a heterogeneous multicasting transmission job for transmitting images created from the same draft by a plurality of communication methods, and is also a different-image heterogeneous multicasting transmission job, in which the plurality of communication methods include a plurality of communication methods in which at least one of a color and a resolution differs among images to be transmitted, the log image creating unit creates a log image in the different-image heterogeneous multicasting transmission job based on an image of a type selected under a specific condition from a plurality of types of images that are eligible for being transmitted in the different-image heterogeneous multicasting transmission job and mutually differ with respect to at least their color or resolution.

12 Claims, 16 Drawing Sheets

91

CAUTION!

It does not have any storage space left for a job log.

ERROR!

Logout is carried out.

It does not have any storage space left for a job log.

FIG. 12

| SYSTEM SETTING | | DIFFERENT-IMAGE HETEROGENEOUS MULTICASTING TRANSMISSION | | SOURCE IMAGE |
|---|---|---|---|---|
| ASSURANCE LEVEL | RESO-LUTION | FAX | Other | |
| High | 72x72 | 204x98 | 200x100 | FAX |
| | | 204x98 | 200x200 | FAX |
| | | 204x98 | 200x400 | FAX |
| | | 204x98 | 300x300 | FAX |
| | | 204x98 | 400x400 | FAX |
| | | 204x98 | 600x600 | FAX |
| | | 204x196 | 200x100 | FAX |
| | | 204x196 | 200x200 | FAX |
| | | 204x196 | 200x400 | FAX |
| | | 204x196 | 300x300 | FAX |
| | | 204x196 | 400x400 | FAX |
| | | 204x196 | 600x600 | FAX |
| | | 204x391 | 200x100 | FAX |
| | | 204x391 | 200x200 | FAX |
| | | 204x391 | 200x400 | FAX |
| | | 204x391 | 300x300 | FAX |
| | | 204x391 | 400x400 | FAX |
| | | 204x391 | 600x600 | FAX |
| | | 408x391 | 200x100 | FAX |
| | | 408x391 | 200x200 | FAX |
| | | 408x391 | 200x400 | FAX |
| | | 408x391 | 300x300 | FAX |
| | | 408x391 | 400x400 | FAX |
| | | 408x391 | 600x600 | FAX |
| | 100x100 | 204x98 | 200x100 | Other |
| | | 204x98 | 200x200 | Other |
| | | 204x98 | 200x400 | Other |
| | | 204x98 | 300x300 | Other |
| | | 204x98 | 400x400 | Other |
| | | 204x98 | 600x600 | Other |
| | | 204x196 | 200x100 | FAX |
| | | 204x196 | 200x200 | FAX |
| | | 204x196 | 200x400 | FAX |
| | | 204x196 | 300x300 | FAX |
| | | 204x196 | 400x400 | FAX |
| | | 204x196 | 600x600 | FAX |
| | | 204x391 | 200x100 | FAX |
| | | 204x391 | 200x200 | FAX |
| | | 204x391 | 200x400 | FAX |
| | | 204x391 | 300x300 | FAX |
| | | 204x391 | 400x400 | FAX |
| | | 204x391 | 600x600 | FAX |
| | | 408x391 | 200x100 | FAX |
| | | 408x391 | 200x200 | FAX |
| | | 408x391 | 200x400 | FAX |
| | | 408x391 | 300x300 | FAX |
| | | 408x391 | 400x400 | FAX |
| | | 408x391 | 600x600 | FAX |
| High | 200x200 | 204x98 | 200x100 | Other |
| | | 204x98 | 200x200 | Other |
| | | 204x98 | 200x400 | Other |
| | | 204x98 | 300x300 | Other |
| | | 204x98 | 400x400 | Other |
| | | 204x98 | 600x600 | Other |
| | | 204x196 | 200x100 | FAX |
| | | 204x196 | 200x200 | Other |
| | | 204x196 | 200x400 | Other |
| | | 204x196 | 300x300 | Other |
| | | 204x196 | 400x400 | Other |
| | | 204x196 | 600x600 | Other |
| | | 204x391 | 200x100 | FAX |
| | | 204x391 | 200x200 | FAX |
| | | 204x391 | 200x400 | FAX |
| | | 204x391 | 300x300 | FAX |
| | | 204x391 | 400x400 | FAX |
| | | 204x391 | 600x600 | FAX |
| | | 408x391 | 200x100 | FAX |
| | | 408x391 | 200x200 | FAX |
| | | 408x391 | 200x400 | FAX |
| | | 408x391 | 300x300 | FAX |
| | | 408x391 | 400x400 | FAX |
| | | 408x391 | 600x600 | FAX |
| | 300x300 | 204x98 | 200x100 | Other |
| | | 204x98 | 200x200 | Other |
| | | 204x98 | 200x400 | Other |
| | | 204x98 | 300x300 | Other |
| | | 204x98 | 400x400 | Other |
| | | 204x98 | 600x600 | Other |
| | | 204x196 | 200x100 | FAX |
| | | 204x196 | 200x200 | Other |
| | | 204x196 | 200x400 | Other |
| | | 204x196 | 300x300 | Other |
| | | 204x196 | 400x400 | Other |
| | | 204x196 | 600x600 | Other |
| | | 204x391 | 200x100 | FAX |
| | | 204x391 | 200x200 | FAX |
| | | 204x391 | 200x400 | FAX |
| | | 204x391 | 300x300 | Other |
| | | 204x391 | 400x400 | Other |
| | | 204x391 | 600x600 | Other |
| | | 408x391 | 200x100 | FAX |
| | | 408x391 | 200x200 | FAX |
| | | 408x391 | 200x400 | FAX |
| | | 408x391 | 300x300 | FAX |
| | | 408x391 | 400x400 | FAX |
| | | 408x391 | 600x600 | FAX |
| Low | any | any | any | FAX |

FIG. 16

LOG IMAGE CREATING SYSTEM THAT CREATES LOG IMAGE OF JOB IN IMAGE FORMING APPARATUS

REFERENCE TO RELATED APPLICATIONS

This application is based upon and claims the benefit of priority from the corresponding Japanese Patent Application No. 2013-091572, filed in the Japan Patent Office on Apr. 24, 2013, the entire contents of which are incorporated herein by reference.

FIELD

The present disclosure relates to a log image creating system that creates a log image to be processed in a job in an image forming apparatus.

BACKGROUND

A typical image forming apparatus creates a log image as a log of an image to be processed in a job.

A heterogeneous multicasting transmission job is known that transmits images created from the same draft by a plurality of communication methods. Heterogeneous multicasting transmission jobs include a job in which a plurality of communication methods used in the job include a plurality of communication methods in which at least one of a color and a resolution differs among images to be transmitted.

SUMMARY

A log image creating system according to an embodiment of the present disclosure includes a job type determining unit and a log image creating unit. The job type determining unit determines the type of job in an image forming apparatus. The log image creating unit creates a log image as a log of an image to be processed in the job. If the job type determining unit determines that the job is a heterogeneous multicasting transmission job for transmitting images created from the same draft by a plurality of communication methods, and is also a different-image heterogeneous multicasting transmission job, in which the plurality of communication methods include a plurality of communication methods in which at least one of a color and a resolution differs among images to be transmitted, the log image creating unit creates a log image in the different-image heterogeneous multicasting transmission job based on an image of a type selected under a specific condition from a plurality of types of images that are eligible for being transmitted in the different-image heterogeneous multicasting transmission job and mutually differ with respect to at least their color and resolution.

A log image creating method according to an embodiment of the present disclosure includes: (i) determining, via a job type determining unit, the type of job in an image forming apparatus; (ii) creating, via a log image creating unit, a log image as a log of an image to be processed in the job; (iii) creating, via the log image creating unit, a log image in the different-image heterogeneous multicasting transmission job based on an image of a type selected under at least one specific condition from a plurality of types of images that are eligible for being transmitted in the different-image heterogeneous multicasting transmission job and mutually differ with respect to at least color or resolution of the images, if the job type determining unit determines that the job is a heterogeneous multicasting transmission job for transmitting images created from the same draft by a plurality of communication methods, and is also a different-image heterogeneous multicasting transmission job, in which the plurality of communication methods include a plurality of communication methods in which at least one of a color and a resolution differs among images to be transmitted.

A non-transitory computer-readable recording medium according to an embodiment of the present disclosure stores a log image creating program by a computer in an image forming apparatus executable. The log image creating program includes first program code and second program code. The first program code causes the computer to determine the type of job in the image forming apparatus. The second code causes the computer to create a log image as a log of an image to be processed in the job. If the job type determining unit determines that the job is a heterogeneous multicasting transmission job for transmitting images created from the same draft by a plurality of communication methods, and is also a different-image heterogeneous multicasting transmission job, in which the plurality of communication methods include a plurality of communication methods in which at least one of a color and a resolution differs among images to be transmitted, the second code causes the computer to create a log image in the different-image heterogeneous multicasting transmission job based on an image of a type selected under a specific condition from a plurality of types of images that are eligible for being transmitted in the different-image heterogeneous multicasting transmission job and mutually differ with respect to at least their colors or resolution.

Additional features and advantages are described herein, and will be apparent from the following detailed description and the figures.

BRIEF DESCRIPTION OF THE DRAWINGS

The drawings are intended to illustrate some aspects and examples of the present disclosure. The drawings described are only schematic and are non-limiting, and are not necessarily drawn to scale.

FIG. 7 illustrates an operation of the MFP in FIG. 2 to permit a user to log in.

FIG. 10 illustrates an operation of the MFP to execute a job after the user has logged in.

FIG. 11 illustrates an example of a log-full warning screen displayed in the operation in FIG. 10.

FIG. 12 illustrates an example of a log-full job error screen displayed in the operation in FIG. 10.

FIG. 16 illustrates an example of a relationship between various conditions for the MFP in FIG. 2 and images from which log images will be created in a different-image heterogeneous multicasting transmission job.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Embodiments of the present disclosure will be described with reference to the drawings.

First, the structure of an image forming system 10 in an embodiment will be described.

Figure 1:
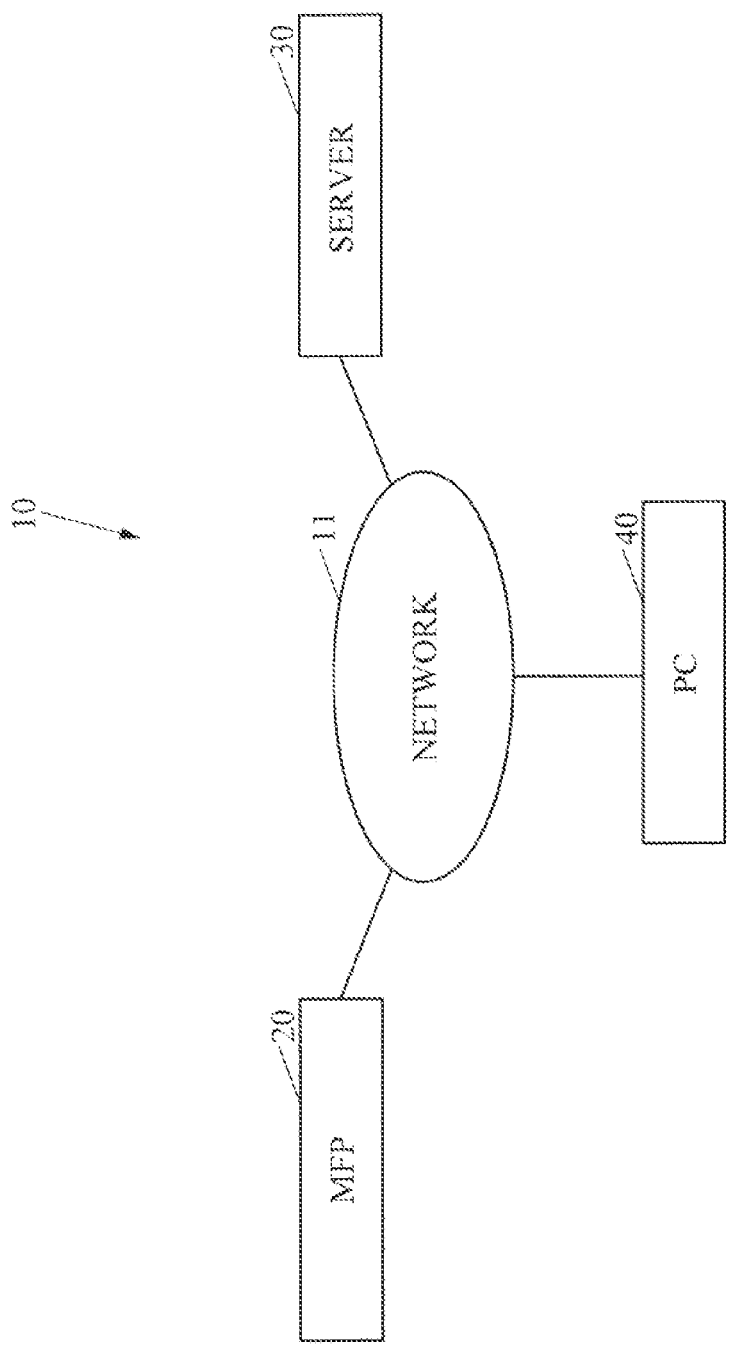
FIG. 1 illustrates the structure of an image forming system in an embodiment of the present disclosure.

FIG. 1 illustrates the structure of the image forming system 10 in the embodiment.

As illustrated in FIG. 1, the image forming system 10 includes a multifunction peripheral (MFP) 20 used as an image forming apparatus that executes jobs, a server 30 used as a computer that stores job logs of the MFP 20, and a personal computer (PC) 40 that can transmit print data to the MFP 20. The MFP 20 and server 30 are interconnected through a network 11 such as, for example, a local area network (LAN) or the Internet so that they can mutually communicate. Similarly, the MFP 20 and PC 40 are interconnected through the network 11 so that they can mutually communicate.

Figure 2:
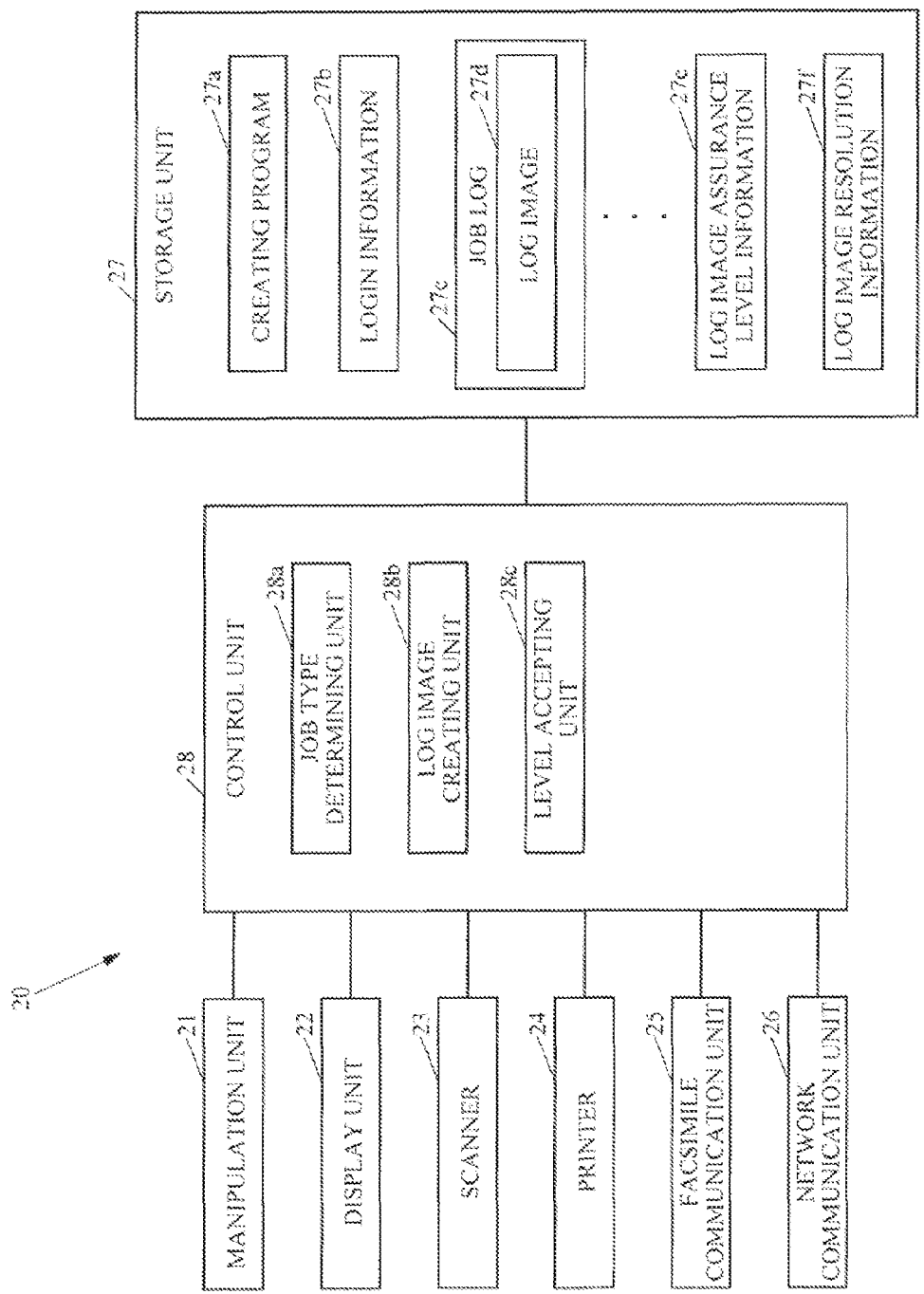
FIG. 2 illustrates the structure of the multifunction peripheral (MFP) in FIG. 1.

FIG. 2 illustrates the structure of the MFP 20.

As illustrated in FIG. 2, the MFP 20 includes: a manipulation unit 21 used as an input device that has, for example, buttons with which the user enters various manipulation inputs; a display unit 22, such as, for example, a liquid crystal display (LCD) unit, on which various types of information are displayed; a scanner 23 that reads out an image from a draft; a printer 24 that prints on paper and other recording media, a facsimile communication unit 25 that performs facsimile communication with an external facsimile device (not illustrated) through a communication line such as a public telephone line; a network communication unit 26 that communicates with an external device thorough the network 11 (see FIG. 1); a storage unit 27, such as, for example, an electrically erasable programmable read-only memory (EEPROM) or a hard disk drive (HDD), that stores various types of data; and a control unit 28 that controls the whole of the MFP 20.

The manipulation unit 21 may include an input device that forms a touch panel together with the display unit 22.

The storage unit 27 stores a log image creating program 27a that is executed by the MFP 20 used as a computer in the present disclosure. The log image creating program 27a may be installed in the MFP 20 when the MFP 20 is manufactured. Alternatively, the log image creating program 27a may be installed in the MFP 20 from a secure digital (SD) card, a universal serial bus (USB) memory or another type of storage medium or through the network 11.

The storage unit 27 can also store login information 27b that is a combination of the ID and password of the user.

The storage unit 27 can also store a plurality of job logs 27c. Each job log 27c includes a log image 27d that is a log of an image to be processed in a job. The log image 27d is, for example, image data in portable document format (PDF).

The storage unit 27 can also store log image assurance level information 27e that indicates a level to which the log image 27d is assured (the level will be referred to below as the log image assurance level), and log image resolution information 27f that indicates the resolution of the log image 27d (the resolution will be referred to below as the log image resolution).

The control unit 28 includes, for example, a central processing unit (CPU), a read-only memory (ROM) in which programs and various types of data have been stored in advance, and a random-access memory (RAM) used by the CPU as a working area. The CPU executes programs stored in the ROM or storage unit 27.

The control unit 28 functions as a job type determining unit 28a that determines the type of a job in the MFP 20 by executing the log image creating program 27a stored in the storage unit 27, a log image creating unit 28b that creates a log image 27d in a job, and a level accepting unit 28c that accepts a log image assurance level.

Jobs include, for example, copying in which an image read out from a draft by the scanner 23 is printed on a recording medium by the printer 24, transmission in which an image read out by the scanner 23 is transmitted to the PC 40 (see FIG. 1) or another apparatus external to the MFP 20, printing in which an image is printed on a recording medium by the printer 24 based on print data received by the network communication unit 26 from the PC 40 or another apparatus external to the MFP 20, and FAX reception and printing in which an image is printed on a recording medium by the printer 24 based on print data received via facsimile by the facsimile communication unit 25 from a facsimile machine external to the MFP 20.

Transmission jobs include heterogeneous multicasting transmission jobs, in which images created from the same draft are transmitted by a plurality of communication methods such as facsimile, electronic mail, and transmission in the file transfer protocol (FTP) and server message block (SMB) protocol. Heterogeneous multicasting transmission jobs include different-image heterogeneous multicasting transmission jobs, in which a plurality of communication methods include a plurality of communication methods in which at least the color or the resolution differ among images to be transmitted. With the MFP 20, when images in a single different-image heterogeneous multicasting transmission job are transmitted by a communication method other than by facsimile, their colors and resolutions are identical. That is, a different-image heterogeneous multicasting transmission job in the MFP 20 is a heterogeneous multicasting transmission job in which communication is performed by both a facsimile communication method and a communication method other than by facsimile.

When the MFP 20 transmits an image by facsimile, 204 dpi×98 dpi, 204 dpi×196 dpi, 204 dpi×391 dpi, and 408 dpi×391 dpi, for example, can be specified as its resolution (referred to below as the FAX transmission resolution). When the MFP 20 transmits an image by a communication method other than by facsimile, 200 dpi×100 dpi, 200 dpi×200 dpi, 200 dpi×400 dpi, 300 dpi×300 dpi, 400 dpi×400 dpi, and 600 dpi×600 dpi, for example, can be specified as its resolution (referred to below as the other transmission resolution). As for a resolution of 204 dpi×98 dpi, the former resolution, 204 dpi, indicates the vertical resolution of the image and the latter resolution, 98 dpi, indicates its horizontal resolution. This is also true for 204 dpi×196 dpi, 204 dpi×391 dpi, 408 dpi×391 dpi, 200 dpi×100 dpi, 200 dpi×200 dpi, 200 dpi×400 dpi, 300 dpi×300 dpi, 400 dpi×400 dpi, and 600 dpi×600 dpi.

When the MFP 20 transmits an image by facsimile, the image is in monochrome. When the MFP 20 transmits an image by a communication method other than by facsimile, the image can be specified in color or monochrome. When the MFP 20 transmits an image by facsimile, the image may be capable of being specified in color or monochrome.

The control unit 28 restricts the capacity of a storage area, in the storage unit 27, in which job logs 27c are stored by using an upper limit on the number of job logs 27c (200, for example) and an upper limit on the total size of all jobs logs 27c (10 GB, for example). If the number of job logs 27c stored in the storage unit 27 reaches its upper limit or the total size of all job logs 27c stored in the storage unit 27 reaches its upper limit, this indicates that the storage unit 27 has no more capacity available to store additional job logs 27c (this state will be referred to below as the log-full state). The control unit 28 enables the manger of the MFP 20 to set the upper limit on the number of job logs 27c and the upper limit on the total size through, for example, the manipulation unit 21.

Next, operations of the image forming system 10 will be described.

An operation of the MFP 20 to accept a specified log image assurance level will be described first.

Figure 3:
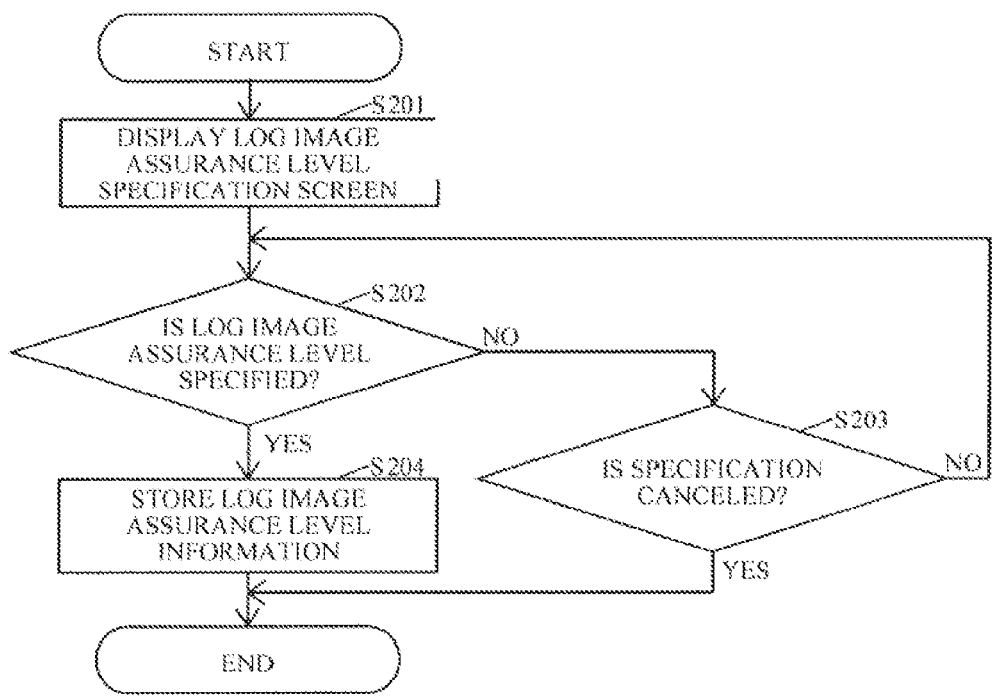
FIG. 3 illustrates an operation of the MFP to accept a specified log image assurance level.

FIG. 3 illustrates the operation of the MFP 20 to accept a specified log image assurance level.

When the manager of the MFP 20 commands the MFP 20 to start an operation to accept a specified log image assurance level through the manipulation unit 21, the control unit 28 in the MFP 20 executes the operation illustrated in FIG. 3.

Figure 4:
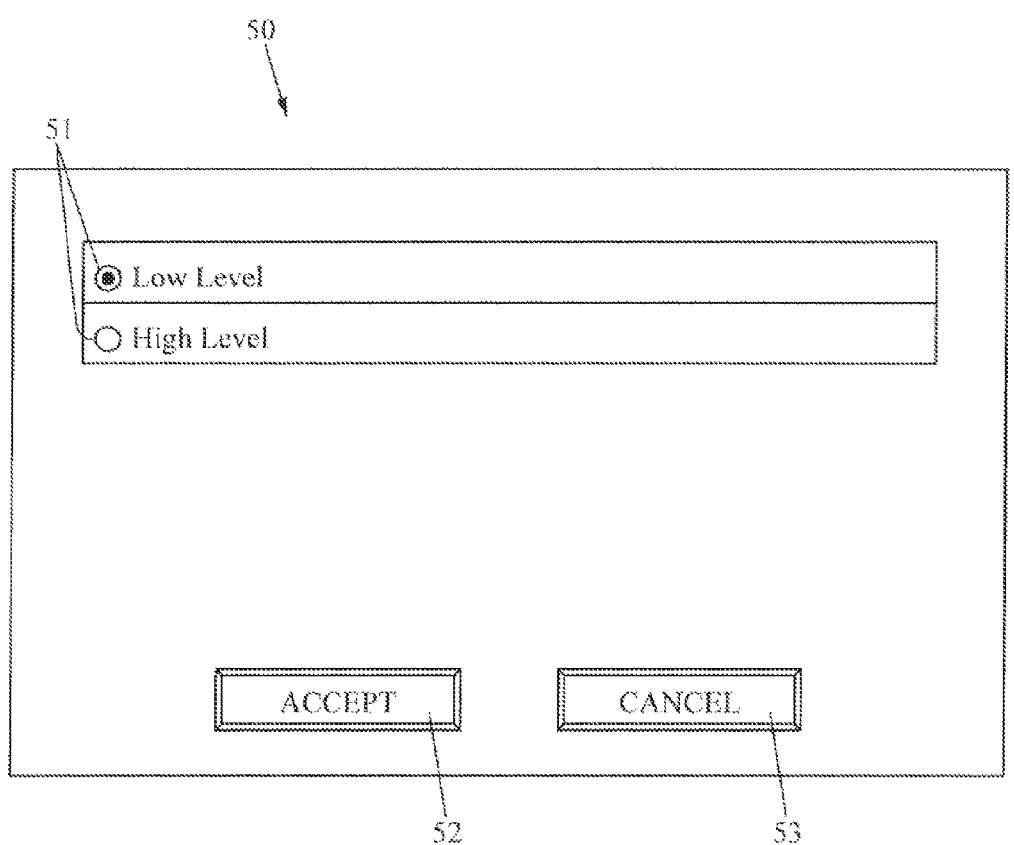
FIG. 4 illustrates an example of a log image assurance level specification screen displayed in the operation in FIG. 3.

As illustrated in FIG. 3, the level accepting unit 28c in the control unit 28 displays, on the display unit 22, a log image assurance level specification screen 50, illustrated in FIG. 4, on which to accept a specified log image assurance level (S201).

FIG. 4 illustrates an example of the log image assurance level specification screen 50.

The log image assurance level specification screen 50 in FIG. 4 includes radio buttons 51 used by the manager to select a log image assurance level through the manipulation unit 21. Log image assurance levels selectable with the radio buttons 51 include, for example, a low level and a high level. At the low level, more importance is place on job execution rather than on the preservation of log images 27d; even in the log-full state, jobs are executed. At the high level, more importance is place on the preservation of log images 27d rather than on job execution; in the log-full state, jobs are not executed. That is, the security level is greater at the high level than at the low level in that log images 27d are preserved. The initial value of the log image assurance level is, for example, the low level.

The log image assurance level specification screen 50 includes a button 52 to accept a specified log image assurance level and a button 53 to cancel the acceptance of the specified log image assurance level.

Referring again to FIG. 3, after the processing in S201, the level accepting unit 28c decides whether a log image assurance level has been specified (S202). If the button 52 has been pressed on the log image assurance level specification screen 50 through the manipulation unit 21, the level accepting unit 28c decides that a log image assurance level has been specified.

If the level accepting unit 28c decides in S202 that a log image assurance level has not been specified, the level accepting unit 28c decides whether the specification of a log image assurance level has been canceled (S203). If the button 53 has been pressed on the log image assurance level specification screen 50 through the manipulation unit 21, the level accepting unit 28c decides that the specification of the log image assurance level has been canceled.

Upon deciding in S203 that the specification of the log image assurance level has been canceled, the level accepting unit 28c terminates the operation illustrated in FIG. 3.

If the level accepting unit 28c decides in S203 that the specification of the log image assurance level has not been canceled, the level accepting unit 28c returns to the processing in S202.

If the level accepting unit 28c decides in S202 that a log image assurance level has been specified, the level accepting unit 28c writes a setting selected through one of the radio buttons 51 to the storage unit 27 as the log image assurance level information 27e (S204), and terminates the operation illustrated in FIG. 3.

Next, an operation of the MFP 20 to accept a specified log image resolution will be described.

Figure 5:
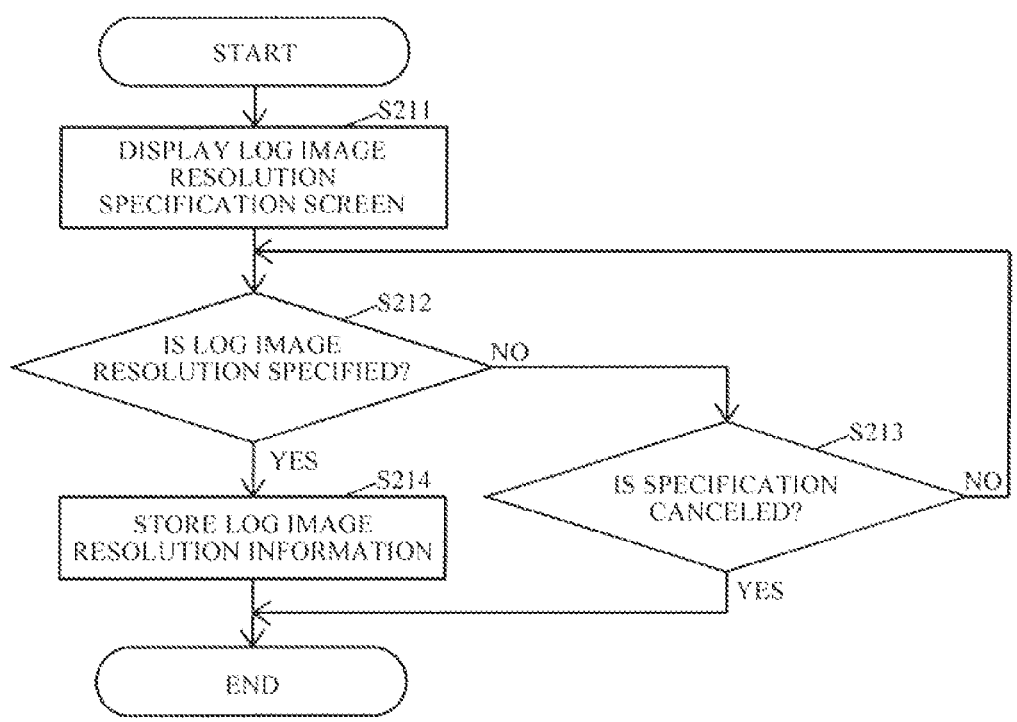
FIG. 5 illustrates an operation of the MFP in FIG. 2 to accept a specified log image resolution.

FIG. 5 illustrates the operation of the MFP 20 to accept a specified log image resolution.

When the manager of the MFP 20 commands the MFP 20 to start an operation to accept a specified log image resolution through the manipulation unit 21, the control unit 28 in the MFP 20 executes the operation illustrated in FIG. 5.

Figure 6:
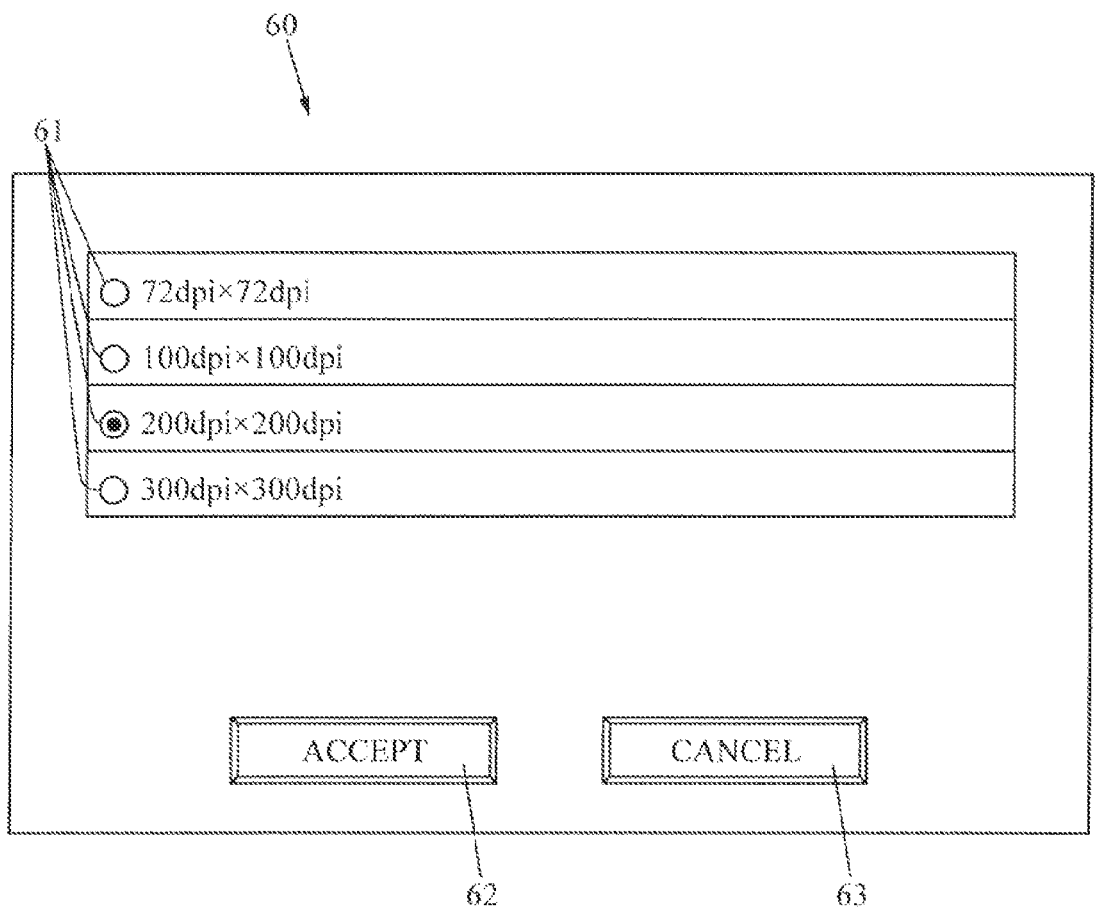
FIG. 6 illustrates an example of a log image resolution specification screen displayed in the operation in FIG. 5.

As illustrated in FIG. 5, the control unit 28 displays, on the display unit 22, a log image resolution specification screen 60, illustrated in FIG. 6, on which to accept a specified log image resolution (S211).

FIG. 6 illustrates an example of the log image resolution specification screen 60.

The log image resolution specification screen 60 in FIG. 6 includes radio buttons 61 used by the manager to select a log image resolution through the manipulation unit 21. Log image resolutions selectable with the radio buttons 61 include, for example, 72 dpi×72 dpi, 100 dpi×100 dpi, 200 dpi×200 dpi, and 300 dpi×300 dpi. As for a resolution of 72 dpi×72 dpi, the former resolution indicates the vertical resolution of the log image 27d and the latter resolution indicates its horizontal resolution. This is also true for 100 dpi×100 dpi, 200 dpi×200 dpi, and 300 dpi×300 dpi. The initial value of the log image resolution is, for example, 200 dpi×200 dpi.

The log image resolution specification screen 60 includes a button 62 to accept a specified log image resolution and a button 63 to cancel the acceptance of the specified log image resolution.

Referring again to FIG. 5, after the processing in S211, the control unit 28 decides whether a log image resolution has been specified (S212). If the button 62 has been pressed on the log image resolution specification screen 60 through the manipulation unit 21, the control unit 28 decides that a log image resolution has been specified.

If the control unit 28 decides in S212 that a log image resolution has not been specified, the control unit 28 decides whether the specification of a log image resolution has been canceled (S213). If the button 63 has been pressed on the log image resolution specification screen 60 through the manipulation unit 21, the control unit 28 decides that the specification of the log image resolution has been canceled.

Upon deciding in S213 that the specification of the log image resolution has been canceled, the control unit 28 terminates the operation illustrated in FIG. 5.

If the control unit 28 decides in S213 that the specification of the log image resolution has not been canceled, the control unit 28 returns to the processing in S212.

If the control unit 28 decides in S212 that a log image resolution has been specified, the control unit 28 writes a setting selected through one of the radio buttons 61 to the storage unit 27 as the log image resolution information 27f (S214), and terminates the operation illustrated in FIG. 5.

Next, an operation of the MFP 20 to permit the user to log in will be described.

Figure 7:
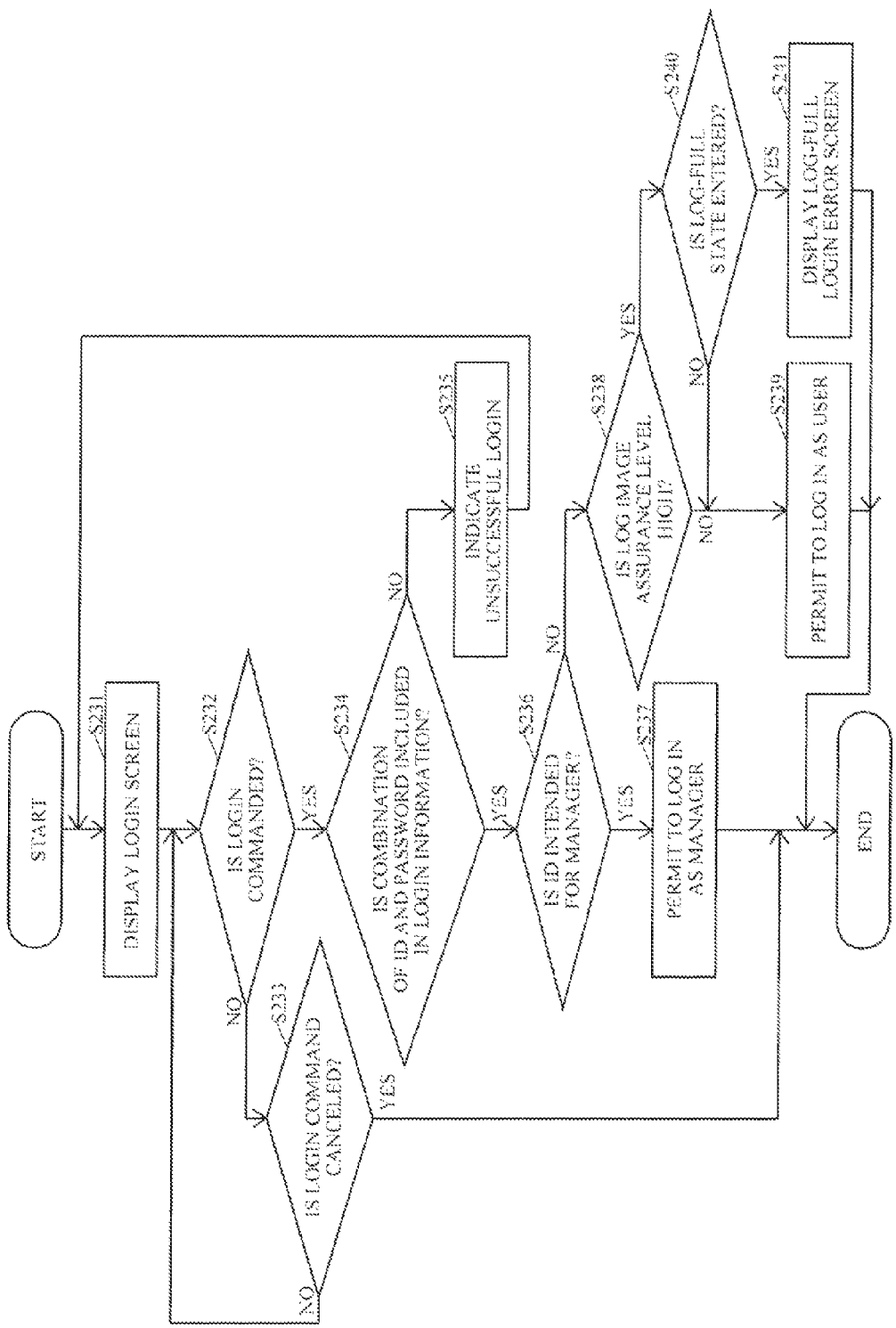

FIG. 7 illustrates an operation of the MFP 20 to permit a user to log in.

When the user commands the MFP 20 to start an operation to accept a login through the manipulation unit 21, the control unit 28 in the MFP 20 executes the operation illustrated in FIG. 7.

Figure 8:
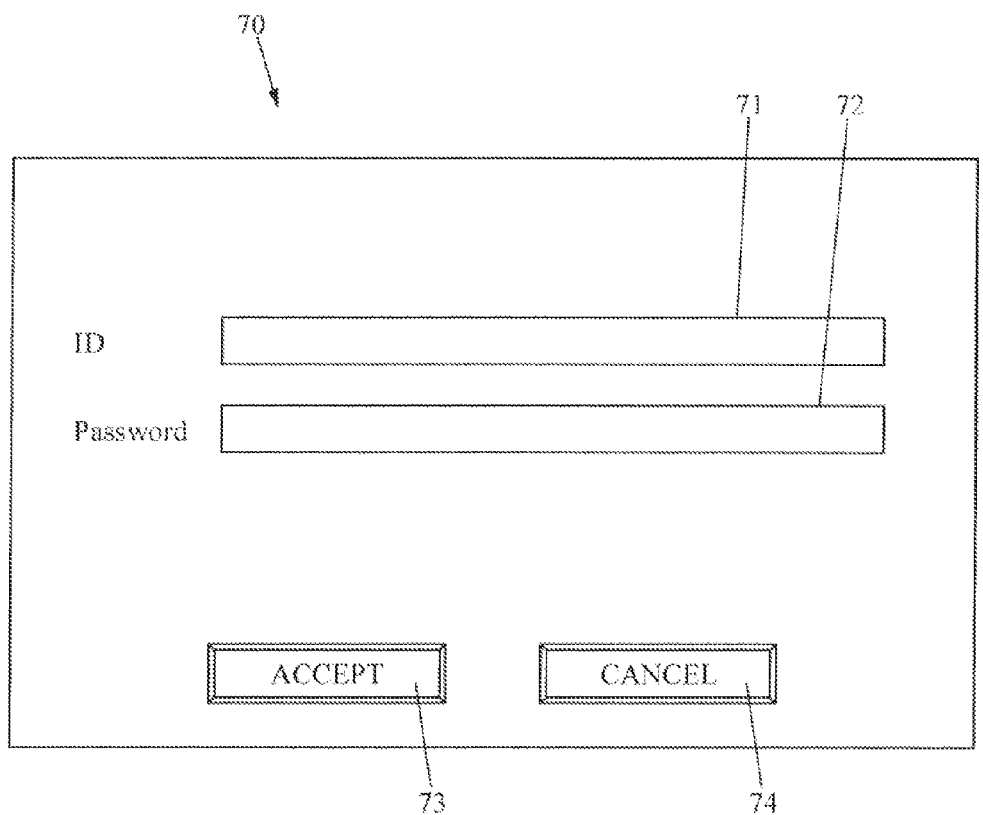
FIG. 8 illustrates an example of a login screen displayed in the operation in FIG. 7.

As illustrated in FIG. 7, the control unit 28 displays, on the display unit 22, a login screen 70, illustrated in FIG. 8, on which to accept a login command (S231).

FIG. 8 illustrates an example of the login screen 70.

The login screen 70 in FIG. 8 includes a text box 71 in which the user enters the user's ID through the manipulation unit 21, a text box 72 in which the user enters the user's password through the manipulation unit 21, a button 73 to accept a login command, and a button 74 to cancel the acceptance of the login command.

Referring again to FIG. 7, after the processing in S231, the control unit 28 decides whether a login has been commanded (S232). If the button 73 has been pressed on the login screen 70 through the manipulation unit 21, the control unit 28 decides that a login has been commanded.

If the control unit 28 decides in S232 that a login has not been commanded, the control unit 28 decides whether a login command has been canceled (S233). If the button 74 has been pressed on the login screen 70 through the manipulation unit 21, the control unit 28 decides that the login command has been canceled.

Upon deciding in S233 that the login command has been canceled, the control unit 28 terminates the operation illustrated in FIG. 7.

If the control unit 28 decides in S233 that the login command has not been canceled, the control unit 28 returns to the processing in S232.

If the control unit 28 decides in S232 that a login has been commanded, the control unit 28 decides whether a combination of the ID specified in the text box 71 and the password specified in the text box 72 is included in the login information 27b stored in the storage unit 27 (S234).

If the control unit 28 decides in S234 that the combination of the ID specified in the text box 71 and the password specified in the text box 72 is not included in the login information 27b, the control unit 28 indicates an unsuccessful login on the display unit 22 (S235) and returns to the processing in S231.

If the control unit 28 decides in S234 that the combination of the ID specified in the text box 71 and the password specified in the text box 72 is included in the login information 27b, the control unit 28 decides whether the specified ID included in the login information 27b is intended for the manager (S236).

If the control unit 28 decides in S236 that the specified ID included in the login information 27b is an ID intended for the manager, the control unit 28 permits the user to log in as the manager (S237) and terminates the operation illustrated in FIG. 7.

If the control unit 28 decides in S236 that the specified ID included in the login information 27b is not an ID intended for the manager, the control unit 28 decides whether the current setting of the log image assurance level is the high level based on the log image assurance level information 27e in the storage unit 27 (S238).

If the control unit 28 decides in S238 that the current setting of the log image assurance level is not the high level, the control unit 28 permits the user to log in as a user (S239) and terminates the operation illustrated in FIG. 7.

If the control unit 28 decides in S238 that the current setting of the log image assurance level is the high level, the control unit 28 decides whether the log-full state has been entered (S240).

Figure 9:
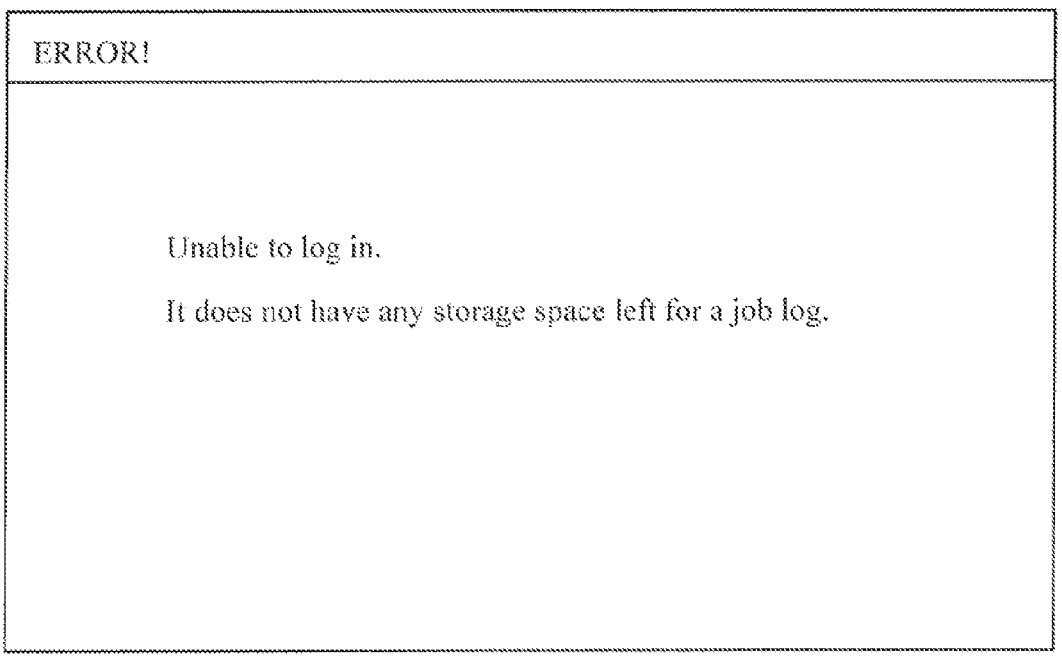
FIG. 9 illustrates an example of a log-full login error screen displayed in the operation in FIG. 7.

If the control unit 28 decides in S240 that the log-full state has been entered, the control unit 28 displays a log-full login error screen 80, illustrated in FIG. 9, on the display unit 22 to notify the user that a login will not be permitted due to the log-full state (S241) and terminates the operation illustrated in FIG. 7.

If the control unit 28 decides in S240 that the log-full state has not been entered, the control unit 28 permits the user to log in as a user (S239) and terminates the operation illustrated in FIG. 7.

Although an operation of the MFP 20 in which the user logs in by entering the user's ID and password through the manipulation unit 21 has been described so far, the login method is not so limited. For example, the MFP 20 may include a card reader. When the user holds the user's login integrated circuit (IC) card over the card reader, the MFP 20 may authenticate the user, after which the MFP 20 may execute the processing in S236 to S241. If the MFP 20 authenticates a user who has held the user's login IC card on a card reader to execute the processing in S236 to S241, the MFP 20 may execute the processing in S236 to S241 without displaying the login screen 70 illustrated in FIG. 8.

Although a login to the MFP 20 through the manipulation unit 21 has been described so far, it is also possible to log in to the MFP 20 from the PC 40 through the network 11. When the user logs in to the MFP 20 from the PC 40 through the network 11, the indications in S231, S235, and S241 are displayed on the display unit of the PC 40.

Next, an operation of the MFP 20 to execute a job after the user has logged in will be described.

Figure 10:
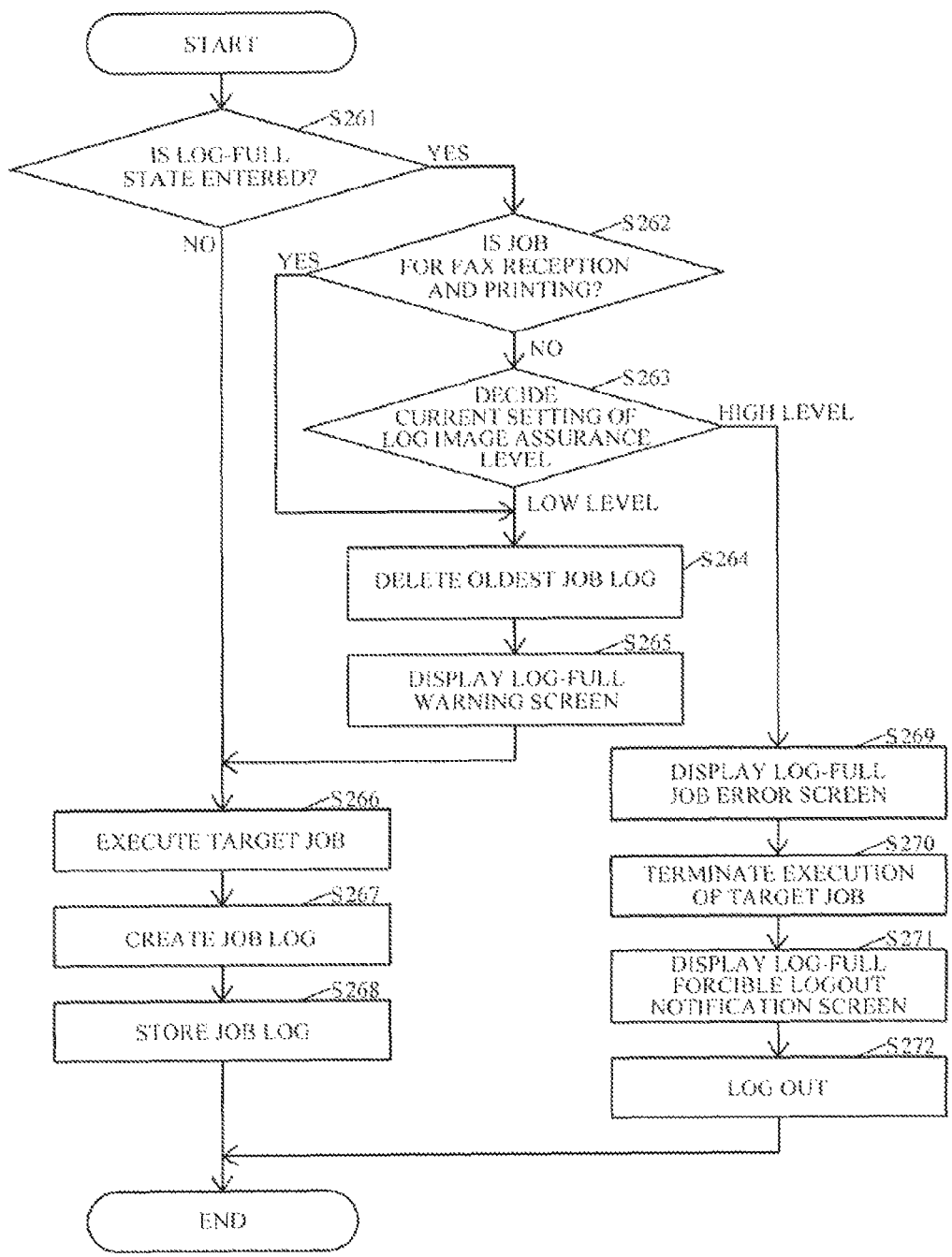

FIG. 10 illustrates an operation of the MFP 20 to execute a job after the user has logged in.

After the user has logged in, the control unit 28 in the MFP 20 executes the operation illustrated in FIG. 10 to execute a job.

As illustrated in FIG. 10, the control unit 28 decides whether the log-full state has been entered (S261).

If the control unit 28 decides in S261 that the log-full state has been entered, the control unit 28 decides whether a job to be executed (referred to below as the target job) is a FAX reception and printing job (S262). The reason why only the FAX reception and printing job is specifically handled is that a FAX reception and printing job itself is a job for which a login is not required and that since a FAX reception and printing job is usually transmitted from a person other than the users of the MFP 20, the execution of the job needs to be assured.

If the control unit 28 decides in S262 that the target job is not a FAX reception and printing job, the control unit 28 decides the current setting of the log image assurance level based on the log image assurance level information 27e in the storage unit 27 (S263).

If the control unit 28 decides in S262 that the target job is a FAX reception and printing job or decides in S263 that the current setting of the log image assurance level is the low level, the control unit 28 deletes the oldest job log 27c in the storage unit 27 (S264) and displays a log-full warning screen 91, illustrated in FIG. 11, on the display unit 22 to notify the user of the log-full state (S265).

If the control unit 28 decides in S261 that that log-full state has not been entered or executes the processing in S265, the control unit 28 executes the target job (S266).

Next, the control unit 28 creates a job log 27c for the target job (S267), stores the created job log 27c in the storage unit 27 (S268), and terminates the operation illustrated in FIG. 10.

If the control unit 28 decides in S263 that the current setting of the log image assurance level is the high level, the control unit 28 displays a log-full job error screen 92 illustrated in FIG. 12 on the display unit 22 to notify the user that job execution will be canceled due to the log-full state (S269) and terminates the execution of the target job (S270).

Figure 13:
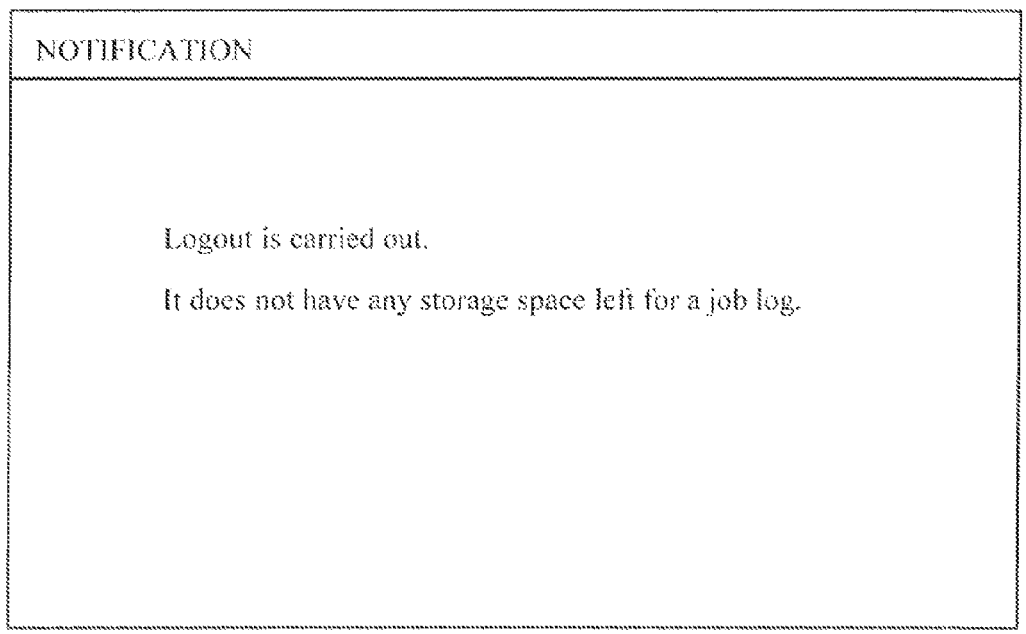
FIG. 13 illustrates an example of a log-full forcible logout notification screen displayed in the operation in FIG. 10.

Next, the control unit 28 displays a log-full forcible logout notification screen 93 illustrated in FIG. 13 on the display unit 22 to notify the user that a forcible logout will be performed (S271), after which the control unit 28 causes the user to log out (S272) and terminates the operation illustrated in FIG. 10.

Although a case in which the MFP 20 is commanded to execute a job through the manipulation unit 21 has been described so far, it is also possible to command the MFP 20 to execute a job from the PC 40 through the network 11. If the MFP 20 is commanded to execute a job from the PC 40 through the network 11, the indications in S265, S269, and S271 are displayed on the display unit of the PC 40.

To notify the manager of the log-full state, the MFP 20 may notify the manager through, for example, electronic mail in S265, instead of or besides the indication in S265.

The job log 27c stored in the storage unit 27 as described above is transmitted by the control unit 28 to the server 30 through the network communication unit 26 at a specific time. The server 30 stores the job log transmitted from the MFP 20. The control unit 28 in the MFP 20 deletes the job log 27c that has been successfully transmitted to the server 30 from the storage unit 27. If the job log 27c has been unsuccessfully transmitted to the server 30 due to a communication error or another reason, the control unit 28 leaves the job log 27c in the storage unit 27 to allow for the next transmission.

The server 30 executes optical character recognition (OCR) processing on the log image of a stored job log to extract the text data of the log image. If the server 30 detects a keyword that violates a security policy in the extracted text data, the server 30 notifies the manager by electronic mail or another method.

Next, an operation of the MFP 20 to create the log image 27d in the creation of the job log 27c in S267 will be described.

Figure 14:
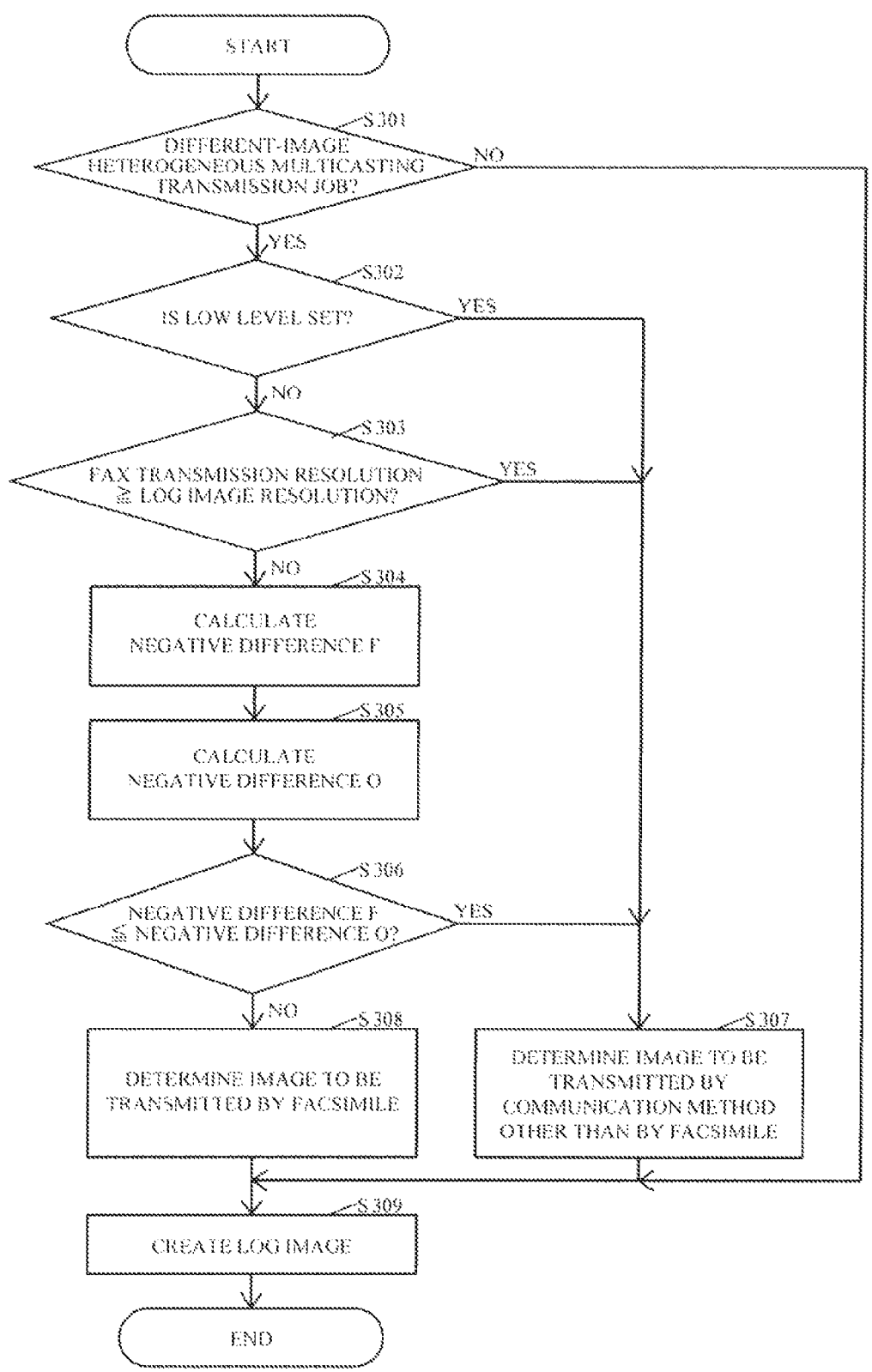
FIG. 14 illustrates an operation of the MFP in FIG. 2 to create a log image.

FIG. 14 illustrates an operation of the MFP 20 to create the log image 27d in the creation of the job log 27c in S267.

As illustrated in FIG. 14, the job type determining unit 28a of the control unit 28 decides whether the target job is a different-image heterogeneous multicasting transmission job (S301). The reason why only the different-image heterogeneous multicasting transmission job is specifically handled is that in a job other than the different-image heterogeneous multicasting transmission job, the log image 27d is created from only one type of image.

If it is decided that the target job is to be a different-image heterogeneous multicasting transmission job in S301, the log image creating unit 28b in the control unit 28 decides whether the low level is set in the log image assurance level information 27e (S302).

If the log image creating unit 28b decides in S302 that the low level is not set in the log image assurance level information 27e, the log image creating unit 28b decides whether the FAX transmission resolution of the different-image heterogeneous multicasting transmission job is greater than or equal to the log image resolution (referred to below as the system resolution) set in the log image resolution information 27f (S303).

If the vertical resolution of the FAX transmission resolution is greater than or equal to the vertical resolution of the system resolution and the horizontal resolution of the FAX transmission resolution is also greater than or equal to the horizontal resolution of the system resolution, the log image creating unit 28b decides that the FAX transmission resolution is greater than or equal to the system resolution. If the vertical resolution of the FAX transmission resolution is less than the vertical resolution of the system resolution or the horizontal resolution of the FAX transmission resolution is less than the horizontal resolution of the system resolution, the log image creating unit 28b decides that the FAX transmission resolution is less than the system resolution.

If the log image creating unit 28b decides in S303 that that the FAX transmission resolution is less than the system resolution, the log image creating unit 28b calculates a negative difference F of the FAX transmission resolution from the system resolution (S304).

Figure 15:
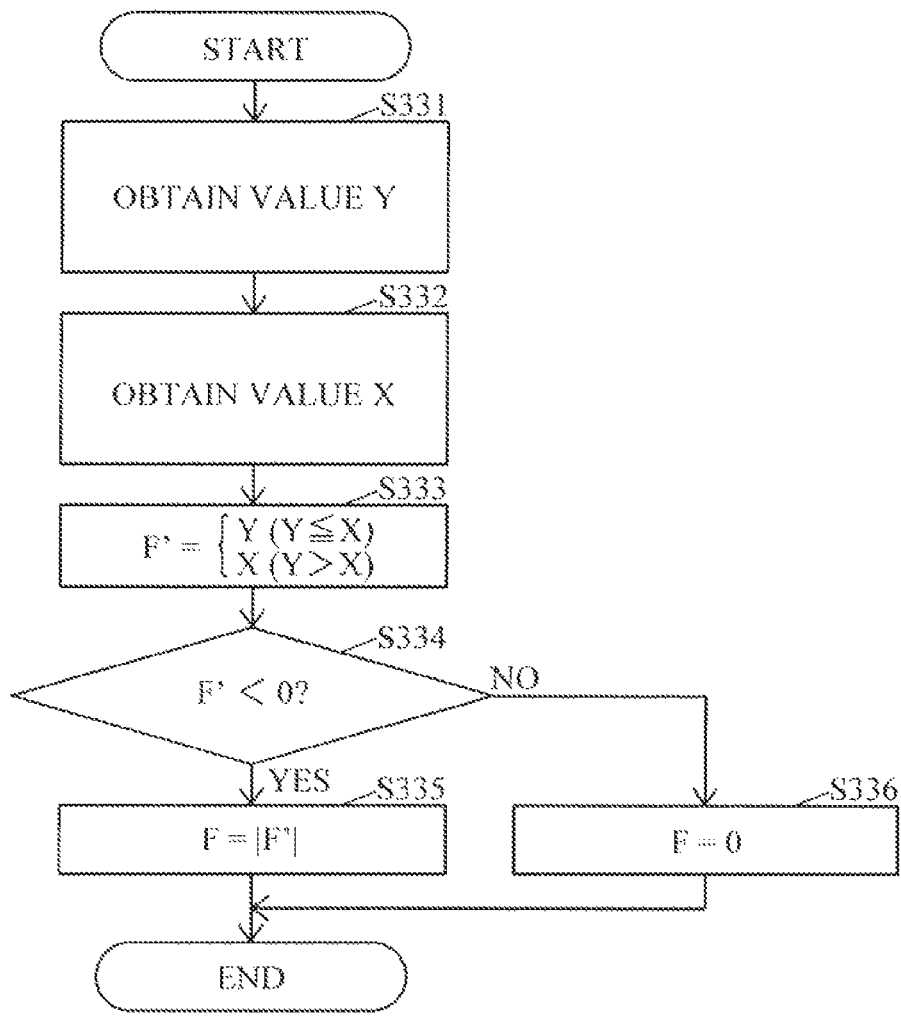
FIG. 15 illustrates an operation of the MFP in FIG. 2 to calculate a negative difference.

FIG. 15 illustrates an operation of the MFP 20 to calculate the negative difference F in S304.

As illustrated in FIG. 15, the log image creating unit 28b of the control unit 28 obtains a value Y by subtracting the vertical resolution of the system resolution from the vertical resolution of the FAX transmission resolution (S331).

Next, the log image creating unit 28b obtains a value X by subtracting the horizontal resolution of the system resolution from the horizontal resolution of the FAX transmission resolution (S332).

Next, the log image creating unit 28b obtains a value F' by selecting the value Y obtained in S331 or the value X obtained in S332, whichever is smaller (S333). If the value Y obtained in S331 and the value X obtained in S332 are identical, the log image creating unit 28b selects the value.

Next, the log image creating unit 28b decides whether the value F' selected in S333 is negative (S334).

If the log image creating unit 28b decides in S334 that the value selected in S333 is negative, the log image creating unit 28b determines the absolute value of the value as the negative difference F (S335) and terminates the operation illustrated in FIG. 15. A negative difference greater than zero indicates that the resolution of the image to be transmitted is less than the system resolution, in which case the resolution of the image must be increased before the image is transmitted. The smaller the difference between the resolution of the image to be transmitted and the system resolution is, the smaller the negative difference is. Therefore, the smaller the negative difference is, the smaller a magnification ratio is, the magnification ratio being required to increase the resolution of the image to be transmitted to at least the system resolution before the image is transmitted.

If the log image creating unit 28b decides in S334 that the value selected in S333 is not negative, the log image creating unit 28b determines the negative difference F to be zero (S336) and terminates the operation illustrated in FIG. 15. A negative difference equal to zero indicates that the resolution of the image to be transmitted is greater than or equal to the system resolution, in which case the resolution of the image does not need to be increased before the image is transmitted. That is, if the negative difference is zero, the magnification ratio required to increase the resolution of the image to be transmitted to at least the system resolution before the image is transmitted is by a factor of one.

Referring again to FIG. 14, upon completion of the processing in S304, the log image creating unit 28b calculates a negative difference O of the other transmission resolution in the different-image heterogeneous multicasting transmission job that is the target job, from the system resolution as in the processing in S304 (S305).

Next, the log image creating unit 28b decides whether the negative difference F is less than or equal to the negative difference O (S306).

If the log image creating unit 28b decides in S302 that the low level is set in the log image assurance level information 27e, decides in S303 that the FAX transmission resolution is greater than or equal to the system resolution, or decides in S306 that the negative difference F is smaller than or equal to the negative difference O, the log image creating unit 28b determines an image to be transmitted by facsimile as an image from which the log image 27d will be created (S307). The image to be transmitted by facsimile has been stored in, for example, the storage unit 27 as the result of the processing in S266.

If the log image creating unit 28b decides in S306 that the negative difference F is greater than the negative difference O, the log image creating unit 28b determines an image to be transmitted by a communication method other than by facsimile as an image from which the log image 27d will be created (S308). The image to be transmitted by a communication method other than by facsimile has been stored in, for example, the storage unit 27 as the result of the processing in S266.

When the log image creating unit 28b operates as described above, the log image creating unit 28b determines an image from which the log image 27d will be created in a different-image heterogeneous multicasting transmission job as illustrated in, for example, FIG. 16. In FIG. 16, the "Assurance level" field in the "System Setting" field indicates log image assurance levels. In the "Assurance level" field, "High" indicates the high level and "Low" indicates the low level. The "Resolution" field in the "System setting" field indicates system resolutions. In the "Different-image heterogeneous multicasting transmission resolution" field, the "FAX" field indicates facsimile transmission resolutions and the "Other" field indicates other transmission resolutions. The "Source image" field indicates an image from which a log image 27d will be created; "FAX" indicates an image to be transmitted by facsimile and "Other" indicates an image to be transmitted by a communication method other than by facsimile.

Referring again to FIG. 14, if the log image creating unit 28b decides in S301 that the target job is not a different-image heterogeneous multicasting transmission job or executes the processing in S307 or S308, the log image creating unit 28b creates a log image 27d (S309). If the resolution of the image from which the log image 27d will be created is less than the system resolution, the log image creating unit 28b magnifies the image from which the log image 27d will be created so that the resolution of the image from which the log image 27d will be created is increased to at least the system resolution before creating the log image 27d.

Upon completion of the processing in S309, the log image creating unit 28b completes the operation illustrated in FIG. 14.

As described above, the MFP 20 does not create a log image 27d based on all of a plurality of types of images as the log image 27d in a heterogeneous multicasting transmission job that is a type of different-image heterogeneous multicasting transmission job, in which a plurality of types of images that mutually differ in at least one of their colors and resolution are transmitted, but creates a log image 27d based on one type of image selected from a plurality of types of images under a specific condition in S302 to S308 (S309), so it is possible to appropriately create a log image 27d in a different-image heterogeneous multicasting transmission job without waste.

Since the MFP 20 creates a log image 27d based on one type of image selected from a plurality of types of images in a different-image heterogeneous multicasting transmission job under a specific condition, a capacity to store log images 27d can be made smaller than in a case in which a log image 27d is created based on all of a plurality of types of images.

Since the MFP 20 creates a log image 27d based on one type of image selected from a plurality of types of images in a different-image heterogeneous multicasting transmission job under a specific condition, an appropriate log image 27d that satisfies conditions can be created unlike a situation in which a log image 27d is created based on an image to be always transmitted by facsimile, the image being one of a plurality of types of images. Since the MFP 20 can appropriately create a log image 27d in a different-image heterogeneous multicasting transmission job, the MFP 20 can create a log image 27d on which OCR processing is to be executed with great precision.

The specific condition under which an image from which a log image 27d will be created is selected indicates that an image to be transmitted by a communication method in which the magnification ratio is the smallest in a plurality of communication methods in the different-image heterogeneous multicasting transmission job is selected (S306), the magnification ratio being required to increase the resolution of the image to at least a specific resolution, that is, at least the system resolution, before the image is transmitted. Therefore, since the MFP 20 creates a log image 27d based on an image to be transmitted by the communication method in which the magnification ratio required to increase the resolution of the image to at least the system resolution to create the log image 27d is the smallest in the plurality of communication methods in the different-image heterogeneous multicasting transmission job (S309), deterioration in the image quality of the log image 27d can be suppressed.

Specific condition under which an image from which a log image 27d will be created is selected indicates that if a specific communication method is selected from a plurality of communication methods in the different-image heterogeneous multicasting transmission job, that is, the resolution of the image to be transmitted by facsimile is at least a specific resolution, that is, at least the system resolution, an image to be transmitted by facsimile is selected (S303). Therefore, if there is no need to increase the resolution of an image to be transmitted by a communication method by facsimile that is one of a plurality of communication methods in the different-image heterogeneous multicasting transmission job, to create a log image 27d, the MFP 20 creates a log image 27d based on an image to be transmitted by facsimile, so the image to be transmitted by facsimile can take precedence as the image from which the log image 27d will be created.

Specific condition under which an image from which a log image 27d will be created is selected indicates that if a specific level, that is, the low level, has been accepted by the level accepting unit 28c, an image to be transmitted by a specific communication method, that is, by facsimile, is selected (S302). Therefore, if the low level has been accepted as the level to assure the log image 27d, the MFP 20 creates a log image 27d based on an image to be transmitted by facsimile, so the image to be transmitted by facsimile can take precedence as the image from which the log image 27d will be created.

The image forming system 10 in an embodiment is structured so that the job type determining unit, log image creating unit, and level accepting unit in the present disclosure are all included in the MFP 20. That is, the log image creating system in the present disclosure is implemented as the MFP 20. However, at least part of the log image creating system in the present disclosure may be included in an apparatus other than the MFP 20 such as the server 30.

Although the image forming system 10 in an embodiment has the MFP as the image forming apparatus in the present disclosure, the image forming system 10 may have an image forming apparatus other than the MFP such as a special printer, a special copier, or a special facsimile machine.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A log image creating system, comprising:
a job type determining unit that determines a type of job in an image forming apparatus; and
a log image creating unit that creates a log image as a log of an image to be processed in the job and if the job type determining unit determines that the job is a heterogeneous multicasting transmission job for transmitting images created from a same draft by a plurality of communication methods, and is also a different-image heterogeneous multicasting transmission job, in which the plurality of communication methods include a plurality of communication methods in which at least one of a color and a resolution differs among images to be transmitted, creates a log image in the different-image heterogeneous multicasting transmission job based on an image of a type selected under a specific condition from a plurality of types of images that are eligible for being transmitted in the different-image heterogeneous multicasting transmission job and mutually differ with respect to at least colors or resolution of the images.

2. The log image creating system according to claim 1, wherein the specific condition indicates that an image to be transmitted by a communication method in which a magnification ratio is smallest in the plurality of communication methods in the different-image heterogeneous multicasting transmission job is selected, the magnification ratio being required to increase a resolution of the image to at least a specific resolution.

3. The log image creating system according to claim 2, wherein the specific condition indicates that, if the resolution of the image to be transmitted by a specific communication method of the plurality of communication methods in the different-image heterogeneous multicasting transmission job is at least the specific resolution, the image to be transmitted in the specific condition is selected.

4. The log image creating system according to claim 1, comprising a level accepting unit that accepts a level at which a log image is assured, wherein
if a specific level has been accepted by the level accepting unit, the specific condition indicates that an image to be transmitted in a specific communication method is selected.

5. A log image creating method, comprising:
determining, via a job type determining unit, a type of job in an image forming apparatus;
creating, via a log image creating unit, a log image as a log of an image to be processed in the job; and
creating, via the log image creating unit, a log image in a different-image heterogeneous multicasting transmission job based on an image of a type selected under at least one specific condition from a plurality of types of images that are eligible for being transmitted in the different-image heterogeneous multicasting transmission job and mutually differ with respect to at least color or resolution of the images, if the job type determining unit determines that the job is a heterogeneous multicasting transmission job for transmitting images created from a same draft by a plurality of communication methods, and is also the different-image heterogeneous multicasting transmission job, in which the plurality of communication methods include a plurality of communication methods in which at least one of a color and a resolution differs among images to be transmitted.

6. The log image creating method according to claim 5, wherein the specific condition indicates that an image to be transmitted by a communication method in which a magnification ratio is smallest in the plurality of communication methods in the different-image heterogeneous multicasting transmission job is selected, the magnification ratio being required to increase a resolution of the image to at least a specific resolution.

7. The log image creating method according to claim 6, wherein the specific condition indicates that, if the resolution of the image to be transmitted by a specific communication method of the plurality of communication methods in the different-image heterogeneous multicasting transmission job is at least the specific resolution, the image to be transmitted in the at least one specific condition is selected.

8. The log image creating method according to claim 5, comprising accepting, via a level accepting unit, a level at which a log image is assured, wherein
if a specific level has been accepted by the level accepting unit, the specific condition indicates that an image to be transmitted in a specific communication method is selected.

9. A non-transitory computer-readable recording medium that stores a log image creating program executable by a computer in an image forming apparatus, the log image creating program includes,
first program code that causes the computer to determine a type of job in the image forming apparatus, and
second program code that causes the computer to create a log image as a log of an image to be processed in the job, and if the first program code determines that the job is a heterogeneous multicasting transmission job for transmitting images created from a same draft by a plurality of communication methods, and is also a different-image heterogeneous multicasting transmission job, in which the plurality of communication methods include a plurality of communication methods in which at least one of a color and a resolution differs among images to be transmitted, causes the computer to create a log image in the different-image heterogeneous multicasting transmission job based on an image of a type selected under at least one specific condition from a plurality of types of images that are eligible for being transmitted in the different-image heterogeneous multicasting transmission job and mutually differ with respect to at least colors or resolution of the images.

10. The non-transitory computer-readable recording medium according to claim 9, wherein the specific condition indicates that an image to be transmitted by a communication method in which a magnification ratio is smallest in the plurality of communication methods in the different-image heterogeneous multicasting transmission job is selected, the magnification ratio being required to increase a resolution of the image to at least a specific resolution.

11. The non-transitory computer-readable recording medium according to claim 10, wherein the specific condition indicates that, if the resolution of the image to be transmitted by a specific communication method of the plurality of communication methods in the different-image heterogeneous multicasting transmission job is at least the specific resolution, the image to be transmitted in the at least one specific condition is selected.

12. The non-transitory computer-readable recording medium according to claim 9, comprising third program code that causes the computer to accept a level at which a log image is assured, wherein
    if a specific level has been accepted by the third program code, the specific condition indicates that an image to be transmitted in a specific communication method is selected.

\* \* \* \* \*